United States Patent [19]
Yamasaki et al.

[11] Patent Number: 6,093,514
[45] Date of Patent: Jul. 25, 2000

[54] (μ)-OXO-ALUMINUM/GALLIUM PHTHALOCYANINE DIMER

[75] Inventors: Yasuhiro Yamasaki; Kenji Takaki; Kazuyoshi Kuroda, all of Neyagawa, Japan

[73] Assignee: Orient Chemical Industries, Ltd., Osaka, Japan

[21] Appl. No.: 09/444,697

[22] Filed: Nov. 24, 1999

[30] Foreign Application Priority Data

Nov. 26, 1998 [JP] Japan .................................. 10-335729

[51] Int. Cl.⁷ .............................. G03G 5/06; C09B 67/04
[52] U.S. Cl. .......................... 430/78; 430/59.4; 540/140; 540/141
[58] Field of Search .................... 430/59.4, 78; 540/140, 540/141

[56] References Cited

U.S. PATENT DOCUMENTS

| | | | |
|---|---|---|---|
| 5,493,016 | 2/1996 | Burt et al. | 540/140 |
| 5,725,984 | 3/1998 | Yamasaki et al. | 430/78 |
| 5,910,384 | 2/1999 | Yamasaki et al. | 430/59.4 |

*Primary Examiner*—Roland Martin
*Attorney, Agent, or Firm*—Birch, Stewart, Kolasch & Birch, LLP

[57] ABSTRACT

The present invention provides novel μ-Oxo-aluminum/gallium phthalocyanine dimer having a structure of the formula (A):

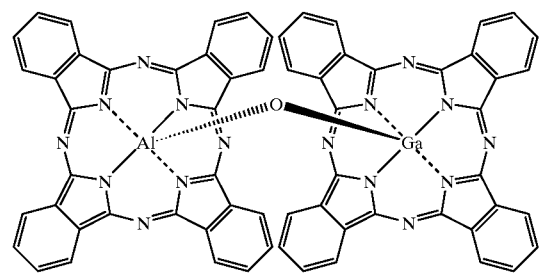

(A)

The μ-oxo-aluminum/gallium phthalocyanine dimer, and the mixed crystals comprising the μ-oxo-aluminum/gallium phthalocyanine dimer are suitable as a charge generating material for an organic photoconductive material, such as an electrophotographic photoreceptor.

17 Claims, 6 Drawing Sheets

(μ)-OXO-ALUMINUM/GALLIUM PHTHALOCYANINE DIMER

FIELD OF THE INVENTION

The present invention relates to novel μ-oxo-aluminum/gallium phthalocyanine dimer (μ-oxo-aluminum phthalocyanine and gallium phthalocyanine dimer) which is preferred to be employed for a photoconductive material, a mixed crystal of the μ-oxo-aluminum/gallium phthalocyanine dimer having a novel polymorph, a process for preparing the same, and an electrophotographic photoreceptor using the same as a charge generating material.

BACKGROUND OF THE INVENTION

In an electrophotographic apparatus such as a copying machine, a printing machine and the like, an organic photoconductor (OPC) which is sensitive to irradiation of a light sauce mounted on the apparatus, have been widely employed. An OPC is generally classified as that of mono-layered construction and of bi-layered construction. A mono-layered OPC is the one which has a mono-layered photoconductive layer composed of a resinous matrix and a charge generating material and a charge transporting material dispersed in the resinous matrix. A bi-layered OPC is the one which has a bi-layered photoconductive layer composed of a charge generating layer and a charge transporting layer laid thereon. The charge generating layer comprises a resinous matrix and a charge generating material dispersed therein. The charge transporting layer comprises a resinous matrix and a charge transporting material dispersed therein.

An organic photoconductive substance which is sensitive to irradiation wavelength region of semi-conductor laser (about 800 nm), has been a matter of interest in the art as a charge generating material.

A lot of OPC employing such an organic photoconductive substance as an active ingredient, have also been proposed. Examples thereof include an OPC which contains a titanyl phthalocyanine compound as a charge generating material.

In recent years, dezitization and speeding up of a copying machine, or a printing machine is progressing. Thus, with respect to the OPC which is for use in an electrophotographic apparatus such as a copying machine, a printing machine and the like, improvement of photoresponse, stability, and durability are strongly desired.

Phthalocyanine (This is hereinafter referred to as "Pc".) shows wide variety of electronic properties depending on a kind of the central metal atom bonded thereto, on a kind of the peripheral substituent, and on a kind of preparing process or treating process. It is also known to the art that even if the chemical structure of Pc is equal, when stacking state of the molecules of Pc is different, electronic properties thereof may vary widely.

The stacking state of an organic compound is determined by a polymorph of the compound. That is, the polymorph of the compound determines an electronic state, particularly a perturbation of π electron of the compound. Therefore, the polymorph of the compound is an important factor for improving electronic properties of an organic photoconductive material.

With reference to the technical background, energetic research and development of a novel photoconductive substance, and a novel polymorph thereof are conducted for achieving a high-performance charge generating material. For example, a charge generating material excellent in stability and durability of photoresponse, and shows middle to high photoresponse, which is suitable for short wavelength irradiation of light emitting diode (LED) or for an OPC of a colour laser beam printing machine (LBP), is desired.

A phthalocyanine compound is typical photoconductive substance. Hydroxyaluminium Pc, and hydroxygallium Pc, various polymorphs thereof for example has been investigated, and are practically applied to an electrophotographic photoreceptor. For example, Japanese Patent Kokai Publication No. 93150/1993 describes hydroxyaluminium Pc having a specific polymorph. Japanese Patent Kokai Publication No. 214415/1994 describes some kinds of hydroxymetal Pc. Japanese Patent Kokai Publication No. 501760/1985 describes hydroxyaluminium Pc having a specific XRD Bragg angle in which green absorption is decreased.

Japanese Patent Kokai Publication Nos. 249716/1993, 263007/1993, 279591/1993, 53892/1995, and 67946/1998 describe a novel polymorph of hydroxygallium Pc.

Journal of Japanese Chemical Society "Chemistry and Industrial Chemistry", 1997, No. 12, pages 887 to 898, YAMASAKI Yasuhiro et al, describes μ-oxo-metal (Al, Ga In) Pc dimer as a charge generating material (CG material) with respect to alignment thereof in a polymorph, or to the method for making it sensitive to short wavelength irradiation.

Japanese Patent Kokai Publication Nos. 362653/1992, and 184452/1992 describe an electrophotographic photoreceptor, and a coating liquid therefor which contain a μ-oxo-metal (III, IV) Pc derivative. Japanese Patent Kokai Publication Nos. 217020/1997, and 88023/1998 describe μ-oxo-aluminum Pc dimer, and μ-oxo-gallium Pc dimer, each having a specific polymorph. Japanese Patent Kokai Publication No. 295259/1995 describes alkoxy crosslinked metal Pc dimer.

SUMMARY OF THE INVENTION

The object of the present invention is to provide a novel photoconductive substance which shows varied photoresponse and electric property.

The present invention provides μ-oxo-aluminum/gallium Pc dimer having a structure of the formula (A):

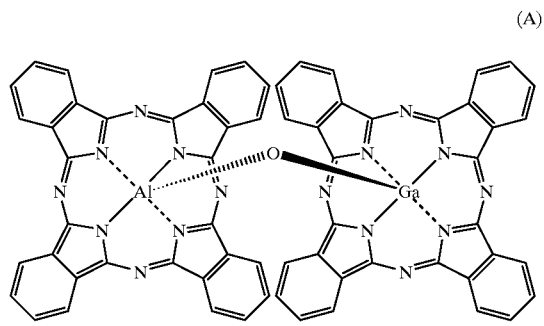

(A)

The present invention further provides a mixed crystal comprising μ-oxo-aluminum/gallium Pc dimer (A). The mixed crystal may comprise μ-oxo-aluminum Pc dimer (B), μ-oxo-gallium Pc dimer (C), or both μ-oxo-aluminum Pc dimer (B), and μ-oxo-gallium Pc dimer (C):

(B)

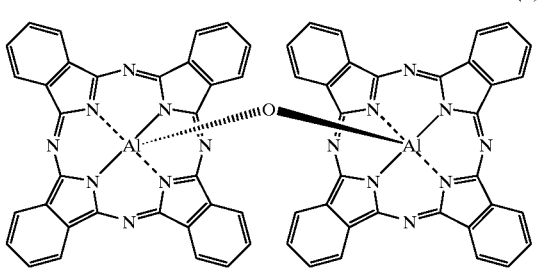

(C)

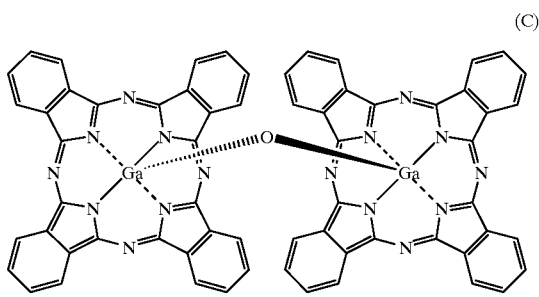

The present invention provides a novel polymorph of the mixed crystal, and a process for preparing the polymorph.

Examples of the mixed crystal of the present invention are as follows:

The mixed crystal having a polymorph which shows diffraction peaks at a Bragg angle (2 θ±0.2°) of 6.6°, 15.2°, 22.5°, 23.0° and 24.0° in an X-ray diffraction spectrum by CuK α-ray [I-form, FIG. 3 shows X-ray diffraction spectrum];

The mixed crystal having a polymorph which shows diffraction peaks at a Bragg angle (2 θ±0.2°) of 6.9°, 15.5°, 13.3° and 24.1° in an X-ray diffraction spectrum by CuK α-ray [Amorphous-form, FIG. 4 shows X-ray diffraction spectrum];

The mixed crystal having a polymorph which shows diffraction peaks at a Bragg angle (2 θ±0.2°) of 6.8°, 9.7°, 15.4° and 23.9° in an X-ray diffraction spectrum by CuK α-ray [II-form, FIG. 5 shows X-ray diffraction spectrum];

The mixed crystal having a polymorph which shows diffraction peaks at a Bragg angle (2 θ±0.2°) of 6.7°, 7.3°, 9.8°, 15.3°, 25.0° and 28.2° in an X-ray diffraction spectrum by CuK α-ray [III-form, FIG. 6 shows X-ray diffraction spectrum]; and The mixed crystal having a polymorph which shows diffraction peaks at a Bragg angle (2 θ±0.2°) of 6.4°, 6.7°, 9.8° and 23.5° in an X-ray diffraction spectrum by CuK α-ray [IV-form, FIG. 7 shows X-ray diffraction spectrum].

The present invention provides a charge generating material for use in an electrophotographic photoreceptor which consists of the mixed crystal, and an electrophotographic photoreceptor which comprises the charge generating material.

DETAILED DESCRIPTION OF THE INVENTION

μ-Oxo-aluminum/gallium Pc dimer (A) of the present invention is a novel compound. The μ-oxo-aluminum/gallium Pc dimer (A); and a mixed crystal comprising μ-oxo-aluminum/gallium Pc dimer (A) may be prepared by the process as described hereinafter, but they are not limited to those prepared by the specific preparation process.

Chlorogallium Pc and chloroaluminium Pc are prepared by first.

A process for preparing chlorogallium Pc is conventionally known to the art. Phthalonitrile or 1,3-diiminoisoindoline are allowed to react with gallium chloride in high boiling point organic solvent such as 1-chloronaphthalene and quinoline. The resulting product is hot filtered, and purified by washing with hot DMF and DMF.

A process for preparing chloroaluminium Pc is conventionally known to the art. Phthalonitrile or 1,3-diiminoisoindoline are allowed to react with aluminium chloride in high boiling point organic solvent such as 1-chloronaphthalene and quinoline. The resulting product is hot filtered and purified by washing with hot toluene and acetone.

The resulting chlorogallium Pc and chloroaluminium Pc are mixed, and acid pasting of the mixture by using concentrated sulfuric acid is conducted. The resulting wet cake is sufficiently washed with water, and is added to a solution of water and 25% ammonia to remove an acidic element. The filtered cake is sufficiently washed with water or ion-exchanged water and dried to obtain a blue solid (a mixture of hydroxymetal Pc and μ-oxo-metal Pc dimer).

The blue solid is added to a water-immiscible solvent such as o-dichlorobenzene, refluxed with stirring, and distilled out the resulting water. The reaction mixture is then hot filtered, washed with hot DMF, DMF, methanol, ion exchanged water, and dried to obtain a crystalline solid.

The crystalline solid seems to be a mixed crystal comprising μ-oxo-aluminum/gallium Pc dimer (A), μ-oxo-aluminum Pc dimer (B), and μ-oxo-gallium Pc dimer (C).

Figure 2:
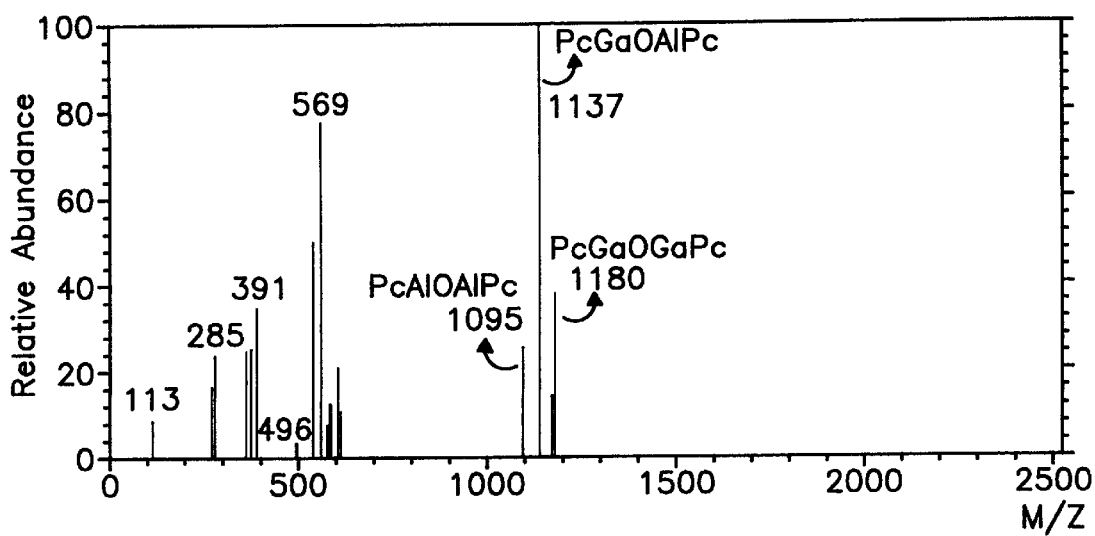
FIG. 2 is a FD-MS spectrum of μ-oxo-aluminum/gallium Pc dimer (I-form, II-form, III-form, and IV-form mixed crystal) of the present invention, which are prepared in Examples 1 to 7.

The result of mass spectrometry shown in FIG. 2 is supporting this fact.

The mixing ratio of chlorogallium Pc and chloroaluminium Pc may optionally be varied. For example it may be varied in the range of from 1/9 to 9/1, preferably from 4/5 to 5/4. It is preferred that the mixing ratio is 1/1 in order to maximize the formation amount of the dimer (A).

The dimers (A), (B), and (C) of the mixed crystal of the present invention are the dimers synthesized from chlorogallium Pc and chloroaluminium Pc by hydrolysis and dehydration. Therefore, content ratio of the dimers (A), (B), and (C) is widely varied depending on the mixing ratio of chlorogallium Pc and chloroaluminium Pc. Thus, the mixed crystal of the present invention may be composed of the dimers (A), (B), and (C); composed of the dimers (A), and (B); or composed of the dimers (A) and (C).

However, it is preferred that the content of $\mu$-oxo-aluminum/gallium Pc dimer (A) is larger than content of $\mu$-oxo-aluminum Pc dimer (B), and larger than content of $\mu$-oxo-gallium Pc dimer (C) in the mixed crystal of the present invention.

$\mu$-Oxo-metal Pc dimer, for example $\mu$-oxo-gallium Pc dimer (C) in the present invention is generally prepared as shown in the following scheme.

That is, chlorogallium Pc (Cl-GaPc) is hydrolyzed to obtain hydroxygallium Pc (HO-GaPc). The specific procedure for this step is known to the art.

For example, chlorogallium Pc is hydrolyzed in an acidic or basic solution, or acid pasting of chlorogallium Pc by using concentrated sulfuric acid is conducted to obtain hydroxygallium Pc. The specific procedure for this step is described in, for example Japanese Patent Kokai Publication Nos. 221459/1989, and 279591/1993.

The wording "acid pasting by using concentrated sulfuric acid" means a process for finely dividing or purifying a pigment. That is, the pigment is dissolved in concentrated sulfuric acid, preferably sulfuric acid having a concentration of not less than 95%, and the resulting solution is poured in ice water.

The resulting hydroxygallium Pc is then heated and dehydrated to obtain $\mu$-oxo-gallium Pc dimer (PcGa-O-GaPc). For example, hydroxyaluminium Pc is refluxed with stirring in a solvent such as o-dichlorobenzene, the resulting water is distilled out, the reaction product is filtered, washed with DMF, with methanol and the like, and dried and milled.

Figure 3:
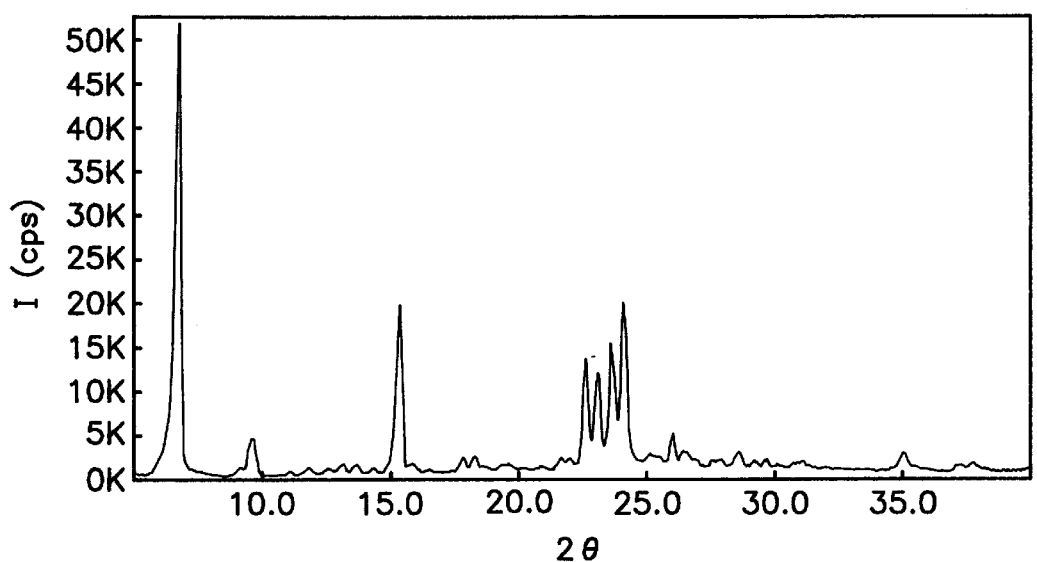
FIG. 3 is a X-ray diffraction spectrum of I-form μ-oxo-aluminum/gallium Pc dimer (I-form mixed crystal), which is prepared in Examples 1, and 6.

According to the preparing process of the present invention, hydrolysis and dimerization partially occur during the acid pasting by using concentrated sulfuric acid. Thereafter, heating and dehydration in a water-immiscible organic solvent having high boiling point is conducted to obtain I-form mixed crystal (polymorph) of the present invention substantially consisting of only $\mu$-oxo-dimer. The specific polymorph of the I-form mixed crystal is novel. FIG. 3 shows XRD spectrum of the I-form mixed crystal polymorph.

Figure 4:
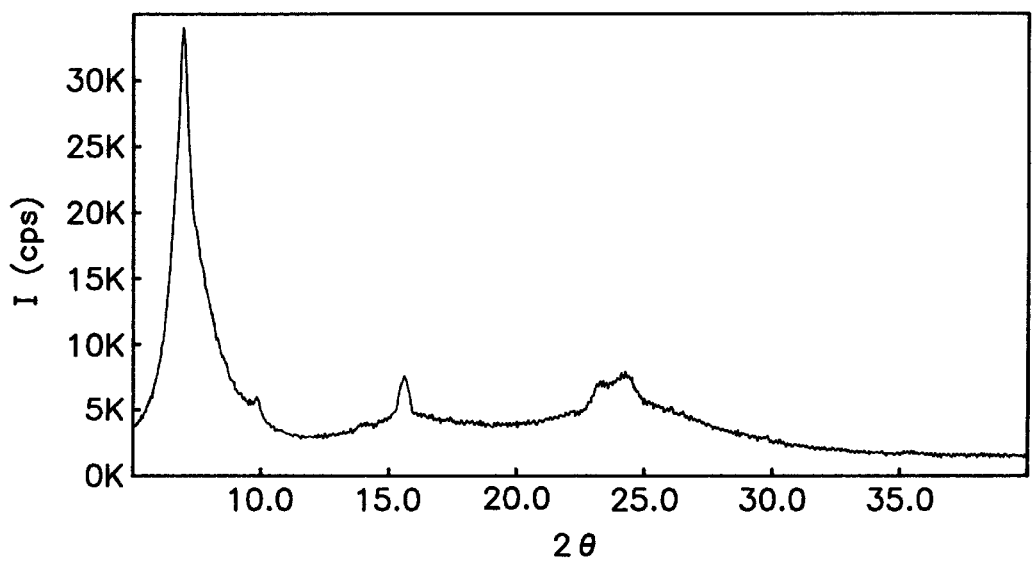
FIG. 4 is a X-ray diffraction spectrum of Amorphous-form μ-oxo-aluminum/gallium Pc dimer (Amorphous-form mixed crystal), which is prepared in Example 2.

Amorphous-form mixed crystal is obtained by dry milling the I-form mixed crystal. The specific polymorph of the Amorphous-form mixed crystal is novel. FIG. 4 shows XRD spectrum of the Amorphous-form mixed crystal.

The wording "dry mill" or "dry milling" of the present specification means the procedure in which a solid substance is milled by using no solvent. The wording "mill" or "milling" means the procedure in which a solid substance is finely divided with mechanical force. The mill or milling is generally conducted on a dispersing machine such as a ball mill, a sand mill, a paint shaker, an attritor, and an automatic mortar, by using optionally a mill medium such as glass beads, steel beads, and alumina beads.

The dry milling is continued until the specific peaks of the I-form mixed crystal disappears, and change of the XRD spectrum comes to stop. It is conducted generally at room temperature for 20 to 100 hours, preferably 48 to 72 hours. If the term of dry milling is less than 20 hours, formation of polymorph becomes insufficient, and even if the term of dry milling is more than 100 hours, useful effect may not be obtained.

When 7 g of sample was milled by using a dispersing machine (a paint shaker for example) in combination with 80 g of glass beads having 5 mm$\phi$, the dry milling is conducted for 48 to 72 hours.

The other novel polymorph of the mixed crystal comprising $\mu$-oxo-aluminum/gallium Pc dimer (A) (II-form, III-form, and IV-form) can be obtained by using the Amorphous-form mixed crystal. The Amorphous-form mixed crystal is wet milled or simply dispersed in the specific solvent at room or raised temperature, to obtain the mixed crystal which has the specific polymorph of the present invention.

The wording "wet mill" or "wet milling" of the present specification means the step in which a solid substance is milled by using a solvent. Wet milling is conducted in substantially the same manner as that of the dry milling, except using a solvent. Thus, a mill medium such as glass beads, steel beads, and alumina beads may be employed in the wet milling. The wording "simply disperse" or "simply dispersing" means the step in which a solid substance is dispersed with stirring into a solvent.

A solvent employed in the present invention does not have to dissolve $\mu$-oxo-metal Pc dimer. The solvent is selected, depending on a kind of the polymorph which is desired. It is generally selected from the group consisting of a ketone solvent, an alcohol solvent, an ether solvent, a (form)amide solvent, an aromatic solvent, a glycol solvent, a pyrrolidone solvent, and an acetate solvent.

Examples of the ketone solvent include linear or cyclic ketones such as cyclohexanone, diisopropyl ketone, methyl ethyl ketone (MEK), methyl isobutyl ketone (MIBK). Examples of the alcohol solvent include monohydric lower alcohols such as methanol, ethanol, propanol, isopropanol, amyl alcohol, hexyl alcohol, and octyl alcohol. Examples of the glycol solvent include alkylene glycols such as ethylene glycol, diethylene glycol, triethylene glycol, and propylene glycol; alkylene glycol monoalkyl ethers such as ethylene glycol monomethyl ether (Methyl cellosolve), ethylene glycol monoethyl ether (Ethyl cellosolve), and propylene glycol monomethyl ether; ethylene glycol dialkyl ethers such as monoglyme, diglyme, triglyme, and tetraglyme. Examples of the formamide solvent include dimethylformamide (DMF), dimethylacetamide, and N-methyl pyrrolidone. Examples of the ether solvent include linear or cyclic ethers such as tetrahydrofuran (THF), dioxane, ethyl ether, and butyl ether. Examples of the acetate solvent include ethyl acetate, and butyl acetate. Examples of the aromatic solvent include hydrocarbons such as toluene, o-xylene, and tetralin, and hydrocarbons having high boiling point such as o-dichlorobenzene, chloronaphthalene, bromonaphthalene, and quinoline.

Examples of the solvent used for preparing I-form mixed crystal of the present invention include an aromatic hydrocarbon having high boiling point such as o-dichlorobenzene, chloronaphthalene, bromonaphthalene, and quinoline. Preferred is 1-chloronaphthalene.

Examples of the solvent used for preparing II-form mixed crystal of the present invention include a ketone solvent, preferably cyclic ketone such as cyclohexanone, more preferably cyclohexanone.

Examples of the solvent used for preparing III-form mixed crystal of the present invention include an amide solvent such as DMF, dimethylacetoamide, and N-methylpyrrolidone, or a cyclic or a linear ether solvent such as THF, dioxane, ethyl ether, and butyl ether. Preferred are DMF and THF.

Examples of the solvent used for preparing IV-form mixed crystal of the present invention include an alcohol solvent having not less than 5 carbon atoms, preferably monohydric alcohol such as amyl alcohol, hexyl alcohol, and octyl alcohol, more preferably 2-hexanol.

Examples of the solvent used for preparing the mixed crystal having the polymorph different from I-form, II-form, III-form, and IV-form of the present invention, include a glycol solvent, preferably ethylene glycol, diethylene glycol, and triethylene glycol. Preferred is ethylene glycol.

Examples of the solvent used for preparing the mixed crystal having the polymorph different from I-form, II-form, III-form, and IV-form of the present invention, include a (poly)ethylene glycol dialkyl ether solvent, preferably diglyme, triglyme, and tetraglyme. Preferred is diglyme.

Examples of the solvent used for preparing the mixed crystal having the polymorph different from I-form, II-form, III-form, and IV-form of the present invention, include an alkylene glycol monoalkyl ether solvent, preferably ethylene glycol monomethyl ether, ethylene glycol monoethyl ether, and propylene glycol monomethyl ether. Preferred is ethylene glycol monomethyl ether.

Examples of the solvent used for preparing the mixed crystal having the polymorph different from I-form, II-form, III-form, and IV-form of the present invention, include a lower alcohol solvent such as methanol, ethanol, propanol, and isopropanol.

The wet milling or simply dispersing is continued by using the above described specific solvent until polymorph of the mixed crystal fixes. It takes generally 5 to 50 hours, preferably 10 to 20 hours at from room temperature up to reflux temperature of the solvent. If the step is conducted less than 5 hours, formation of the polymorph becomes insufficient, and even if the step is conducted more than 50 hours, useful effect may not be obtained.

When 1-chloronaphthalene is used as the solvent, simply dispersing of Amorphous-form mixed crystal is conducted with refluxing for about 15 to 30 hours to obtain I-form mixed crystal of the present invention.

When cyclohexanone is used as the solvent, wet milling of Amorphous-form mixed crystal polymorph is conducted for about 30 to 40 hours to obtain II-form mixed crystal polymorph of the present invention.

When DMF is used as the solvent, simply dispersing of Amorphous-form mixed crystal is conducted at room temperature for about 10 to 12 hours to obtain III-form mixed crystal of the present invention.

When THF is used as the solvent, simply dispersing of Amorphous-form mixed crystal is conducted with refluxing for about 10 to 12 hours to obtain III-form mixed crystal of the present invention.

When 1-hexanol is used as the solvent, simply dispersing of Amorphous-form mixed crystal is conducted with refluxing for about 10 hours to obtain IV-form mixed crystal of the present invention.

The $\mu$-oxo-aluminum/gallium Pc dimer, and the mixed crystal comprising the $\mu$-oxo-aluminum/gallium Pc dimer are useful as a charge generating material for a photoconductive material which may be widely applied to an apparatus exemplifying the electrophotographic art, such as a copying machine.

A photoconductive material which comprises the $\mu$-oxo-aluminum/gallium Pc dimer, and the mixed crystal of the present invention, is suitable for use as a charge generating layer of an electrophotographic photoreceptor, and shows good charging property, low, middle and high photoresponse, and high durability (durability of photoresponse and durability of electric potential).

An electrophotographic photoreceptor generally has a conductive substrate, and a photoconductive layer formed thereon which comprises a charge generating material and a charge transporting material. The photoconductive layer may be classified depending on its structure, i.e., a mono-layered one and a bi-layered one. The $\mu$-oxo-aluminum/gallium Pc dimer or the mixed crystal of the present invention may be employed in both the mono-layered photoconductive layer and the bi-layered photoconductive layer.

However, it is preferred that they are applied to the is bi-layered photoconductive layer because each of the layers in the bi-layered photoconductive layer do not inhibit the respective functions, and they efficiently transfer the generated charge to a surface of the electrophotographic photoreceptor without trapping the charge, and therefore, electronic properties of the $\mu$-oxo-aluminum/gallium Pc dimer or of the mixed crystal may sufficiently be exhibited. The electrophotographic photoreceptor which has bi-layered construction is generally called as a functional separated-type photoreceptor.

The functional separated-type photoreceptor is prepared by, for example, forming a charge generating layer on a conductive substrate, and forming a charge transporting layer thereon. Examples of the conductive substrate include metal (e.g., aluminium, nickel), metal vapor-deposited film, and the like, in the form of a drum, a sheet or a belt.

The $\mu$-oxo-aluminum/gallium Pc dimer or the mixed crystal of the present invention may be included as a charge generating material in the charge generating layer. The charge generating layer is formed as a thin layer on the conductive substrate. It can be formed by vapor-depositing the $\mu$-oxo-aluminum/gallium Pc dimer, but is generally formed by applying a binder resin dispersion of the dimer. The binder resin dispersion may be prepared by dispersing the $\mu$-oxo-aluminum/gallium Pc dimer into a solution of a suitable binder resin, using a usual dispersing apparatus such as a ball mill, a sand mill, a paint shaker, and the like.

A process for coating the binder resin dispersion is not specifically limited, and suitably include bar coating, dip coating, spin coating, roller coating, calendar coating, and the like. The coated layer may be dried at a temperature of 30 to 200° C. for 5 minutes to 2 hours in the presence or absence of air blasting.

A solvent optionally be employed for preparing the dispersion. The solvent employed in the present invention is not particularly limited unless it solves $\mu$-oxo-aluminum/gallium Pc dimer. However, a solvent which may disperse $\mu$-oxo-aluminum/gallium Pc dimer uniformly and may solve the binder resin, is preferred. Examples thereof include alcohol solvents such as methanol, ethanol, isopropanol, and butanol; aromatic solvents such as toluene, xylene and tetralin; halogenated solvents such as dichloromethane, chloroform, trichloroethylene and carbon tetrachloride; ester solvents such as ethyl acetate and propyl acetate; ether solvents such as ethylene glycol monoethyl ether, dioxane and tetrahydrofuran; dimethylformamide and dimethyl sulfoxide.

The binder resin can be selected from a wide range of insulating resins. Examples of the preferred resin include condensation resins such as polycarbonate, polyester, polyamide, and polyarylate; addition polymers such as polystyrene, polyacrylate, styrene-acrylic copolymer, polyacrylamide, polymethacrylate, polyvinyl butyral, polyvinyl alcohol, polyacrylonitrile, polyacrylic-butadiene copolymer, polyvinyl chloride and vinyl chloride-vinyl acetate copolymer; organic photoconductive resins such as poly-N-vinyl carbazole and polyvinylanthracene; polysulfone, polyether sulfone, silicone resin, epoxy resin and urethane resin. These are used alone or in combination thereof.

The binder resin is employed in an amount of from 0.1 to 3.0 ratio by weight, preferably 0.5 to 2.0 by weight based on the charge generating material. When the amount is more than 3.0, the amount of charge decreases, and photoresponse of the photoconductive layer becomes poor. The charge generating layer is preferably formed in a thickness of from 0.05 to 5.0 μm, preferably 0.1 to 3.0 μm. When the thickness is more than 5.0 μm, charge may readily be trapped, and photoresponse of the photoconductive layer becomes poor. The thickness is generally not more than 10 μm.

A charge transporting layer containing a charge transporting material is then formed on the charge generating layer. This layer may be formed in the same manner as described above, for forming the charge generating layer. That is, a charge transporting material is dissolved in a solvent with a binder resin, and the resulting solution is uniformly applied on the charge generating layer, followed by drying.

Examples of the charge transporting material include conventional materials such as an oxazole derivative, an oxadiazole derivative, a pyrazoline derivative, a hydrazone derivative, a hydrazine derivative, a triazine derivative, a quinazoline derivative, a triarylamine compound, a styryltriphenylamine compound, a butadiene compound, a carbazole compound, and a benzofuran compound.

Specific examples of the charge transporting material include the compounds of the following formulae:

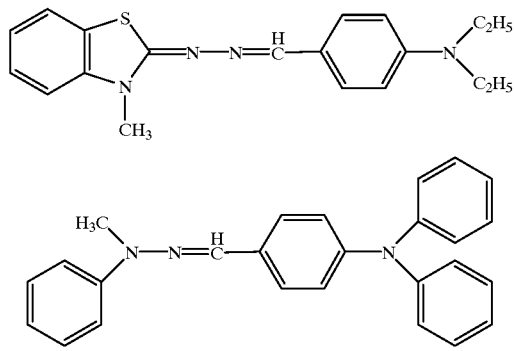

The compounds are available from Fuji Photofilm Co. Ltd., as "CT-501 (trade name)", and "CT-504 (trade name)", respectively.

Examples of the binder resin and solvent for the charge transporting layer include the same materials as those employed for the charge generating layer.

The binder resin is employed in an amount of from 0.1 to 5.0 ratio by weight, preferably 0.5 to 2.0 ratio by weight based on the charge transporting material. When the amount is more than 5.0, concentration of the charge transporting material in the charge transporting layer becomes small, and photoresponse of the photoconductive layer becomes poor. The charge transporting layer is preferably formed in a thickness of from 5 to 100 μm, preferably from 5 to 50 μm. When the thickness is more than 100 μm, long time is required for transporting the charge, and the charge may readily be trapped, and thereby photoresponse of the photoconductive layer becomes poor.

The charge generating layer, the charge transporting layer, and an optional surface protecting layer, may additionally include various additives such as a sensitizing agent conventionally used in the art, an oxidation inhibiting agent, e.g., an amine compound, and a phenol compound, an aging inhibiting agent such as a UV absorber, e.g., a benzophenone compound.

EXAMPLES

The following Examples and Comparative Examples further illustrate the present invention in detail but are not to be construed to limit the scope thereof.

The X-ray diffraction spectrum by CuK β-ray was measured by using the automatic X-ray diffraction system "MXP3" manufactured by Max Science Co. Ltd.

Synthesis Example 1
Synthesis of chlorogallium Pc 145.5 g (1.13 mol) of phthalonitrile, 680 ml of 1-chloronaphthalene, and 50.0 g (0.284 mol) of gallium (III) chloride were charged in a 2000 ml glass four-necked flask equipped with requisite apparatuses such as a stirrer, a calcium chloride tube and the like, and the mixture was heated and allowed to reflux with stirring at 255° C. for 12 hours. Heating was then stopped and the mixture was cooled to about 130° C., and hot filtered and washed with 2000 ml of hot (100° C.) DMF, and 1000 ml of DMF.

The resulting wet cake was dispersed in 1500 ml of DMF, and refluxed with stirring for 3 hours. The mixture was hot filtered, and washed again with 1000 ml of hot (110° C.) DMF and 1000 ml of DMF. This procedure was repeated two times, and the resulting cake was washed with 1000 ml of methanol and 1000 ml of water, and dried at 70° C. to obtain 128.8 g of blue solid chlorogallium Pc (yield 73.5%). The results of elemental analysis were shown in Table 1.

TABLE 1

|  | C | H | N | Cl | Ga |
|---|---|---|---|---|---|
| Calculated % | 62.23 | 2.61 | 18.13 | 5.74 | 11.29 |
| Found % | 61.99 | 2.44 | 17.54 | 5.92 | 9.99 |

Synthesis Example 2
Synthesis of chloroaluminium Pc 180.0 g (1.41 mol) of phthalonitrile, 900 ml of 1-chloronaphthalene, and 47.0 g (0.353 mol) of aluminium (III) chloride were charged in a 2000 ml glass four-necked flask equipped with requisite apparatuses such as a stirrer, a calcium chloride tube and the like, and the mixture was heated and allowed to reflux with stirring at 240° C. for 6 hours. Heating was then stopped and the mixture was cooled to about 130° C., and hot filtered and washed with 1800 ml of hot (100° C.) toluene, 80 ml of toluene, 900 ml of acetone. The acetone was then replaced with 100 ml of toluene.

The resulting wet cake was dispersed in 750 ml of toluene, and refluxed with stirring for 3 hours. The mixture was hot filtered at 100° C., and washed again with 1800 ml of hot (100° C.) toluene, 80 ml of toluene, and 900 ml of acetone. The acetone was then replaced with 700 ml of toluene. This procedure was repeated three times.

The resulting wet cake was dispersed in 750 ml of toluene, and stirred with refluxing for 3 hours. The mixture was hot (100° C.) filtered, and washed with 1800 ml of hot (100° C.) toluene, 180 ml of toluene, and 900 ml of acetone. The acetone was then replaced with 400 ml of water.

The resulting cake was added to 4500 ml of water, and dispersed with heating at 70° C. for 1 hour, hot filtered, washed with 900 ml of acetone, and 1000 ml of water, and dried at 70° C. to obtain 187.6 g of blue solid chloroaluminium Pc (yield 92.5%). The results of elemental analysis were shown in Table 2.

TABLE 2

|  | C | H | N | Cl | Al |
|---|---|---|---|---|---|
| Calculated % | 66.85 | 2.81 | 19.48 | 6.17 | 4.69 |
| Found % | 62.26 | 3.23 | 16.90 | 5.98 | 4.15 |

Example 1

Synthesis of I-form mixed crystal of $\mu$-oxo-aluminum/gallium Pc dimer (Part 1)

A mixture of 6.17 g (0.01 mol) of chlorogallium Pc prepared in Synthesis Example 1, and 5.75 g (0.01 mol) of chloroaluminium Pc prepared in Synthesis Example 2, was slowly added to 357 g of concentrated sulfuric acid, with controlling a temperature thereof between 0 to 5° C., and the mixture was stirred for 2 hours. The mixture was then slowly added to 1400 g of ice and 600 ml of water with stirring so that the temperature is kept not more than 10° C., and dispersed for 1 hours after the addition.

The mixture was allowed to stand, a supernatant was removed, and filtered. The resulting wet cake was washed with 2000 ml of water, and was dispersed in 1800 ml of water, and filtered under reduced pressure. The wet cake was washed with 800 ml of water, dispersed in 550 ml of warm water and 66 ml of 25% aqueous ammonia, and stirred with refluxing for 6 hours. The product was filtered again, and the resulting cake was thoroughly washed with 600 ml of warm water (60° C.), and 1650 ml of ion exchanged water. When pH and electroconductivity of a filtrate became the level equal to that of ion exchanged water, the cake was dried at 70° C. to obtain 10.5 g of blue solid (yield 89.8%).

9.0 g of the blue solid was added to 150 ml of o-dichlorobenzene, and the mixture was stirred at a temperature between 170 to 180° C. with removing the resulting water for about 10 hours. The mixture was hot filtered at 130° C., washed with 225 ml of hot (110° C.) DMF, 45 ml of DMF, 90 ml of methanol, and 225 ml of ion exchanged water. The product was dried at 70° C. to obtain 8.4 g of I-form mixed crystal of $\mu$-oxo-aluminum/gallium Pc dimer (yield 95%). The results of elemental analysis were shown in Table 3.

TABLE 3

|  | C | H | N | Al | Ga |
|---|---|---|---|---|---|
| Calculated % | 67.57 | 2.84 | 19.69 | 2.37 | 6.13 |
| Found % | 66.78 | 2.70 | 18.63 | 2.15 | 5.65 |

Figure 1:
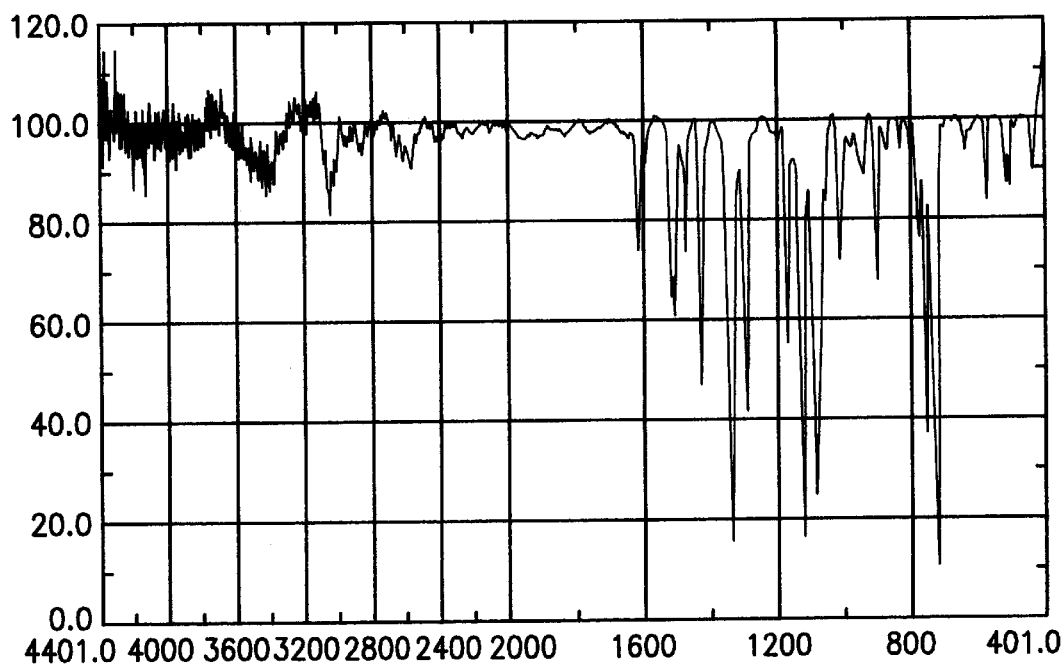
FIG. 1 is an infrared absorption spectrum of I-form μ-oxo-aluminum/gallium Pc dimer (I-form mixed crystal), which is prepared in Example 1.

An infrared absorption spectrum of the product was shown in FIG. 1. An FD-MS spectrum of the product was shown in FIG. 2. Peaks of FIG. 2 show that the resulting I-form mixed crystal comprises $\mu$-oxo-aluminum Pc dimer (B), and $\mu$-oxo-gallium Pc dimer (C) in addition to $\mu$-oxo-aluminum/gallium Pc dimer (A).

Conditions for FD-MS analysis (Field Desorption-MS) is shown in Table 4.

(1) Method for Measurement

TABLE 4

Apparatus: MS:JVS-DX303HF (manufactured by JEOL K.K.)
Conditions: FD method by using a carbon emitter
Resolution: 1500, or 500; 35 to 1700 M/Z
Accelerating voltage: 2.5 kV
Ion multiplier voltage: 1.6 to 1.8 kV
Emitter current: 0 to 40 mA
Cathode voltage: 5.0 kV
Solvent: DMF (2) Results: FIG. 2

In FIG. 2, horizontal axis represents M/Z (ratio of mass to electric charge), and vertical axis represents relative abundance. Ion peaks of $\mu$-oxo-aluminum/gallium Pc dimer at M/Z=1137 [M+H]$^+$, of $\mu$-oxo-aluminum Pc dimer at M/Z=1095 [M+H]$^+$, and of $\mu$-oxo-gallium Pc dimer at M/Z=1180 [M+H]$^+$, were found.

FIG. 3 shows XRD spectrum (X-ray diffraction spectrum) of this mixed crystal. The mixed crystal had the polymorph which shows diffraction peaks at a Bragg angle (2 $\theta$±0.2°) of 6.6°, 15.2°, 22.5°, 23.0°, and 24.0°. Thus, it is I-form mixed crystal.

Example 2

Synthesis of Amorphous-form mixed crystal of $\mu$-oxo-aluminum/gallium Pc dimer 7.0 g of the I-form mixed crystal prepared in Example 1, and 80 g of glass beads having a diameter of 5 mm$\phi$ were charged in a 140 ml wide-mouthed bottle, and the mixture was dry milled until the specific XRD peaks of the I-form mixed crystal disappeared, and change of the XRD spectrum came to stop, using a dispersing apparatus (paint shaker). When polymorph of the mixed crystal fixed, the glass beads were filtered out, and 6.9 g of blue solid (Amorphous-form mixed crystal) was obtained.

An X-ray diffraction spectrum of the product was shown in FIG. 4. Bragg angles of the peaks at XRD spectrum of the product were shown in Table 5.

Example 3

Synthesis of II-form mixed crystal of $\mu$-oxo-aluminum/gallium Pc dimer 1.0 g of the Amorphous-form mixed crystal prepared in Example 2, and 48 g of glass beads having a diameter of 5 mm$\phi$ were added to 30 ml of cyclohexanone, and the mixture was refluxed with stirring (simply dispersed) until change of the XRD spectrum stops. The mixture was hot filtered at 130° C., the beads were removed, washed with 100 ml of cyclohexanone, and 100 ml of methanol. The wet cake was dried at 50° C. under vacuum to obtain 0.57 g of blue solid (II-form mixed crystal).

Figure 5:
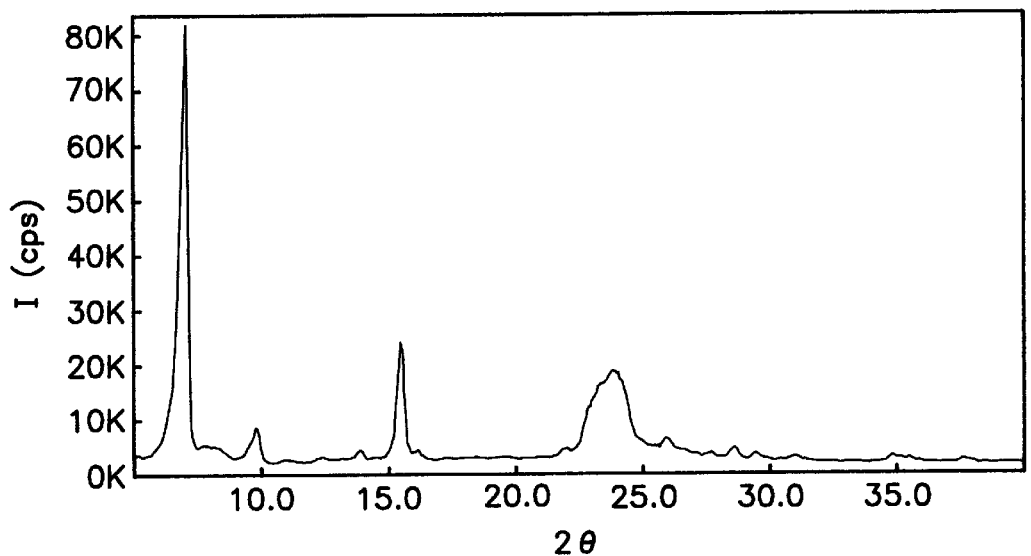
FIG. 5 is a X-ray diffraction spectrum of II-form μ-oxo-aluminum/gallium Pc dimer (II-form mixed crystal), which is prepared in Example 3.

An X-ray diffraction spectrum of the product was shown in FIG. 5. Bragg angles of the peaks at XRD spectrum of the product were shown in Table 5.

Example 4

Synthesis of III-form mixed crystal of μ-oxo-aluminum/gallium Pc dimer (Part 1)

1.0 g of the Amorphous-form mixed crystal prepared in Example 2 was added to 30 ml of DMF, and the mixture was stirred (simply dispersed) at room temperature for about 22 hours until change of the XRD spectrum came to stop. The mixture was filtered, and washed with 100 ml of DMF, and 100 ml of methanol. The wet cake was dried at 50° C. under vacuum to obtain 0.89 g of blue solid (III-form mixed crystal).

Figure 6:
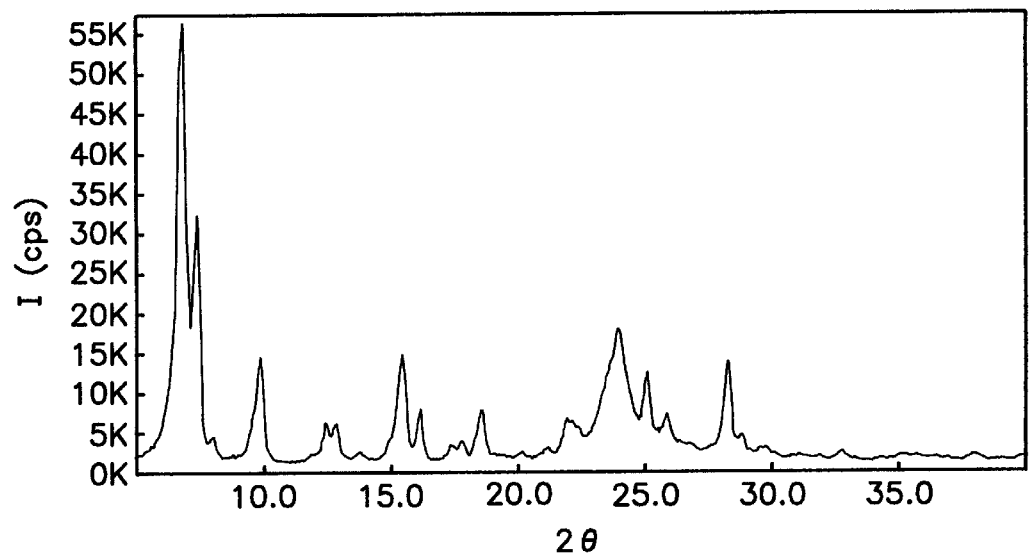
FIG. 6 is a X-ray diffraction spectrum of III-form μ-oxo-aluminum/gallium Pc dimer (III-form mixed crystal), which is prepared in Examples 4, and 5.

An X-ray diffraction spectrum of the product was shown in FIG. 6. Bragg angles of the peaks at XRD spectrum of the product were shown in Table 5.

Example 5

Synthesis of III-form mixed crystal of μ-oxo-aluminum/gallium Pc dimer (Part 2)

1.0 g of the Amorphous-form mixed crystal prepared in Example 2 was added to 30 ml of THF, and the mixture was stirred (simply dispersed) at room temperature until change of the XRD spectrum came to stop. The mixture was filtered, washed with 100 ml of THF, and 100 ml of methanol. The wet cake was dried at 50° C. under vacuum to obtain 0.86 g of blue solid (III-form mixed crystal).

An X-ray diffraction spectrum of the product was equal to that of Example 4 (FIG. 6).

Example 6

Synthesis of I-form mixed crystal of μ-oxo-aluminum/gallium Pc dimer (Part 2)

1.0 g of the Amorphous-form mixed crystal prepared in Example 2 was added to 30 ml of 1-chloronaphthalene, and the mixture was heated with stirring (simply dispersed) until change of the XRD spectrum came to stop. The mixture was filtered, and washed with 100 ml of 1-chloronaphthalene, and 100 ml of methanol. The wet cake was dried at 50° C. under vacuum to obtain 0.61 g of blue solid (I-form mixed crystal).

An X-ray diffraction spectrum of the product was equal to that of Example 1 (FIG. 3).

Example 7

Synthesis of IV-form mixed crystal of μ-oxo-aluminum/gallium Pc dimer 1.0 g of the Amorphous-form mixed crystal prepared in Example 2 was added to 30 ml of 1-hexanol, and the mixture was heated with stirring (simply dispersed) until change of the XRD spectrum came to stop. The mixture was filtered, and washed with 100 ml of 1-hexanol, and 100 ml of methanol. The wet cake was dried at 50° C. under vacuum to obtain 0.68 g of blue solid (IV-form mixed crystal).

Figure 7:
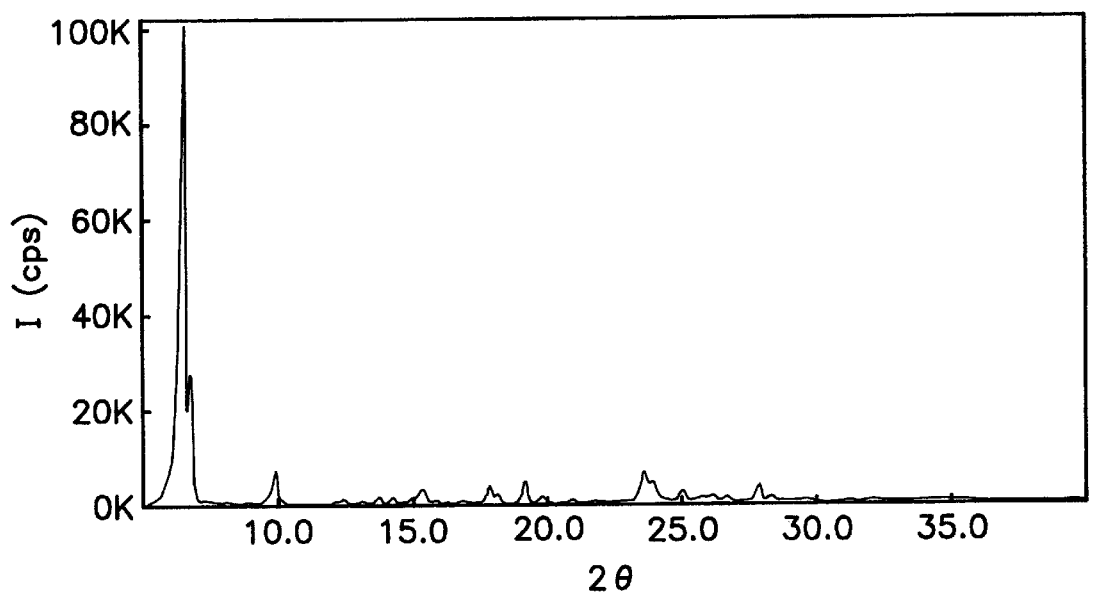
FIG. 7 is a X-ray diffraction spectrum of IV-form μ-oxo-aluminum/gallium Pc dimer (IV-form mixed crystal), which is prepared in Example 7.

An X-ray diffraction spectrum of the product was shown in FIG. 7. Bragg angles of the peaks at XRD spectrum of the product were shown in Table 5.

Table 5 shows the Bragg angles of peaks at the XRD spectrum which belong to the mixed crystals synthesized in Examples 1 to 7.

TABLE 5

| Exam. | Polymorph | Bragg Angle (2θ ± 0.2°) | FIG. |
|---|---|---|---|
| 1,6 | I | 6.6, 15.2, 22.5, 23.0 and 24.0 | 3 |
| 2 | Amorphous | 6.9, 15.5, 13.3 and 24.1 | 4 |
| 3 | II | 6.8, 9.7, 15.4 and 23.9 | 5 |
| 4,5 | III | 6.7, 7.3, 9.8, 15.3, 25.0 and 28.2 | 6 |
| 7 | IV | 6.4, 6.7, 9.8 and 23.5 | 7 |

Examples 8 to 14

The examples illustrate a function separated-type electrophotographic photoreceptor to which the mixed crystal of μ-oxo-aluminum/gallium Pc dimer of the present invention was applied as a charge generating material (CG material).

Example 8

0.2 g of the Amorphous-form mixed crystal prepared in Example 2, 0.2 g of a polyvinyl butyral resin ("ELEX BH-3" available from Sekisui Kagaku K.K.), 59.6 g of cyclohexanone, and 50 g of glass beads having a diameter of 3 mmφ were charged in a wide-mouthed bottle. The mixture was shook for 1 hour using a dispersing apparatus (paint shaker), and applied on an aluminum plate by a bar coater. The coating was dried in air to form a charge generating layer having a thickness of 0.5 μm.

The compound p-(N,N'-diphenylamino)benzaldehyde-N'-methyl-N'-phenylhydrazone available from Fuji Photofilm Co. Ltd., as "CT-501 (trade name)" was employed as the CT material a. The compound N-[p-(diethylamino)benzylidene] N'-(3-methyl-2-benzothiazolidene)hydrazine available from Fuji Photofilm Co. Ltd., as "CT-504 (trade name)" was employed as the CT material b.

4.5 g of the CT material a, or the CT material b, 4.5 g of a polycarbonate resin ("PANLIGHT L-1250" available from Teijin K.K.), and 51.0 g of methylene chloride were charged in a wide-mouthed bottle. The mixture was homogenized by using supersonic wave, and applied on the charge generating layer by a bar coater. The coating was dried in air to form a charge transporting layer having a thickness of 60 μm. Thereby, a bi-layered electrophotographic photoreceptor was prepared.

Examples 9 to 14

Electrophotographic photoreceptors were prepared according to substantially the same manner as described in Example 8, except that the mixed crystals obtained in Examples 3 to 7 (II-form of Example 3, III-form of Example 4, III-form of Example 5, I-form of Example 6, IV-form of Example 7) were employed in order as a CG material instead of the mixed crystal obtained in Example 1.

Comparative Example 1

An electrophotographic photoreceptor was prepared according to substantially the same manner as described in Example 8, except that the μ-oxo-aluminum Pc dimer described in Japanese Patent Kokai Publication No. 217020/1997 was employed as a CG material instead of the mixed crystal obtained in Example 1.

Comparative Example 2

An electrophotographic photoreceptor was prepared according to substantially the same manner as described in Example 8, except that the μ-oxo-gallium Pc dimer described in Japanese Patent Kokai Publication No. 88023/1998 was employed as a CG material instead of the mixed crystal obtained in Example 1.

Comparative Example 3

An electrophotographic photoreceptor was prepared according to substantially the same manner as described in Example 8, except that the χ-form free metal Pc described in Japanese Patent Kokai Publication No. 207184/1995 was employed as a CG material instead of the mixed crystal obtained in Example 1.

Evaluation of Electrophotographic Photoreceptors

Electrophotographic properties of the electrophotographic photoreceptors prepared in Examples 8 to 14 and Comparative Examples 1 to 3 were measured. A static electricity charging tester "EPA-8200" manufactured by Kawaguchi Denki K.K. was used as the measuring apparatus.

The sample was corona charged at −8.0 kV in STAT 3 mode by first. It was then left in the dark for 2.0 seconds, and irradiated by 5.0 lux white light for 10.0 seconds. The initial charged potential ($V_{max}$), the dark decay rate (%), the residual potential ($V_r$) and the half-value exposure amount (pohotoresponse) ($E_{1/2}$ ($\mu J/cm^2$)) were measured.

The dark decay rate was calculated according to the following formula:

$$\text{Dark decay rate } (\%) = 100 \times (V_{max} - V_2)/V_{max}$$

wherein $V_{max}$ represents the charged potential immediately after charging, $V_2$ represents the surface potential after 2 seconds from charging. The results were shown in Table 6.

TABLE 6

| Ex. No. | CG | CT·X | $V_{max}$ (V) | Dark Decay (%) | $V_{re}$ (V) | Photo-response $E_{1/2}$ (1x · s) |
|---|---|---|---|---|---|---|
| 9 | Amor- | a | −540.7 | 13.69 | −28.3 | 4.19 |
|   | phous | b | −513.7 | 13.95 | −17.7 | 4.47 |
|   | (Ex. 2) |   |   |   |   |   |
| 10 | II | a | −324.0 | 19.76 | −53.7 | — |
|   | (Ex. 3) | b | −306.7 | 21.28 | −6.7 | — |
| 11 | III | a | −152.7 | 40.61 | −2.3 | 1.75 |
|   | (Ex. 4) | b | −175.0 | 43.83 | −1.7 | 1.48 |
| 12 | III | a | −444.0 | 21.28 | −9.3 | 2.01 |
|   | (Ex. 5) | b | −455.0 | 18.73 | −2.0 | 2.42 |
| 13 | I | a | −529.7 | 11.58 | −48.7 | — |
|   | (Ex. 6) | b | −488.3 | 14.75 | −49.0 | — |
| 14 | IV | a | −228.7 | 14.43 | −5.0 | 2.67 |
|   | (Ex. 7) | b | −213.3 | 17.51 | −1.7 | 2.64 |
| C. Ex. 1 | AlPc dimer | a | −412.0 | 26.10 | −24.0 | 3.21 |
|   |   | b | −443.3 | 23.20 | −18.0 | 3.27 |
|   |   | c | −356.3 | 34.00 | −30.7 | 3.28 |
| C. Ex. 2 | GaPc dimer | a | −576.0 | 12.97 | −4.3 | 1.40 |
|   |   | b | −515.7 | 20.40 | −3.3 | 1.35 |
|   |   | c | −559.3 | 16.33 | −18.0 | 1.44 |
| C. Ex. 3 | χ-form $H_2Pc$ | a | −491.7 | 12.40 | −7.0 | 2.85 |
|   |   | b | −492.7 | 17.90 | −2.3 | 3.06 |
|   |   | c | −606.7 | 15.00 | −9.7 | 2.85 |

X·CT materials are as follows:
a: p-(N,N'-diphenylamino)benzaldehyde-N'-methyl-N'-phenylhydrazone available from Fuji Photofilm Co. Ltd., as "CT-501 (trade name)"
b: N-[p-(diethylamino)benzylidene]-N'-(3-methyl-2-benzothiazolidene)hydrazine available from Fuji Photofilm Co. Ltd., as "CT-504 (trade name)"
c: 4-benzylamino-2-methylbenzaldehyde-1,1'-diphenylhydrazone available from Takasa Koryo K. K., as "CTC-191 (trade name)"

Figure 8:
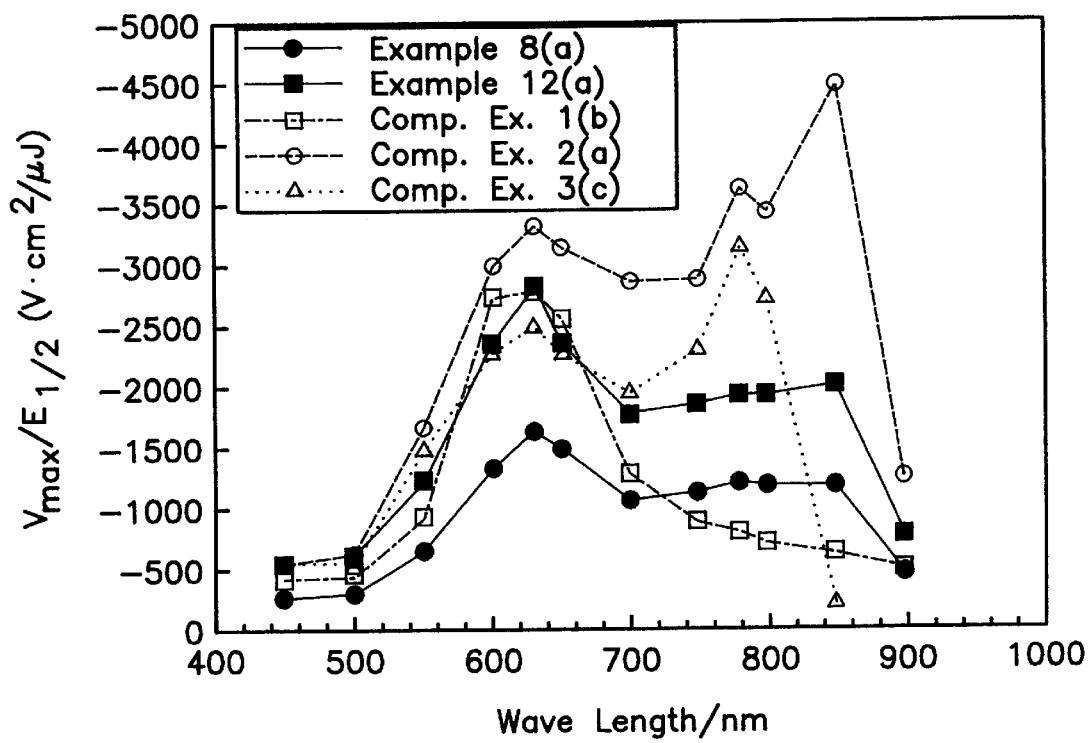
FIG. 8 is a plot of results obtained by spectral response analysis of photoreceptors of the present invention.

Spectral response of the electrophotographic photoreceptors prepared in Examples 8 (a), 11 (a), Comparative Examples 1 (b), 2 (a), 3 (c) was measured according to substantially the same manner as described above, except that the wavelength of irradiation light was altered from 450 to 900 nm at 50 nm or 25 nm interval by employing a band-pass interference filter. The exposure energy was set to 1.00 $\mu W$. The initial charged potential ($V_{max}$), and half-value exposure amount (photoresponse) ($E_{1/2}$) at the respective wavelengths were measured. The results were shown in FIG. 8.

Figure 9:
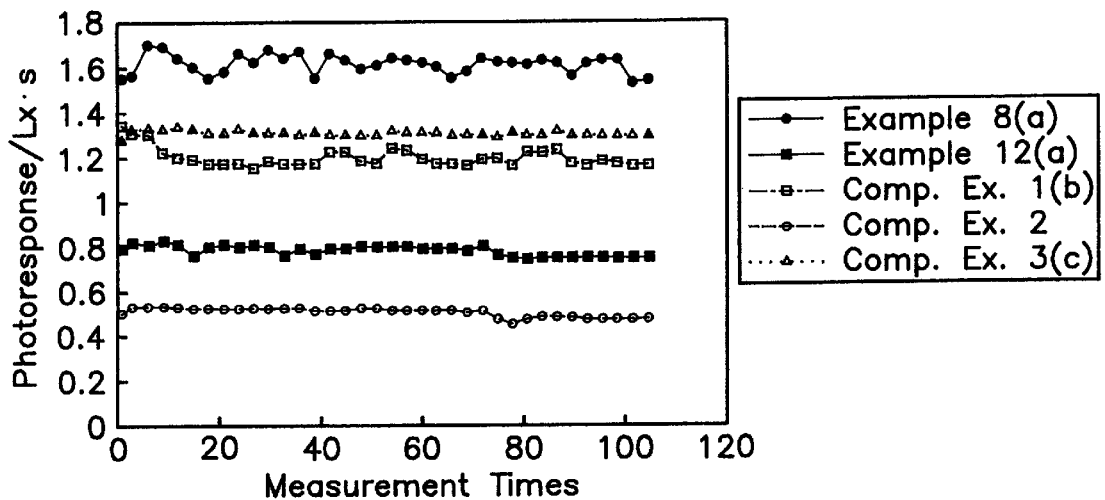
FIG. 9 is a plot of results obtained by photoresponse durability analysis of photoreceptors the present invention.
Figure 10:
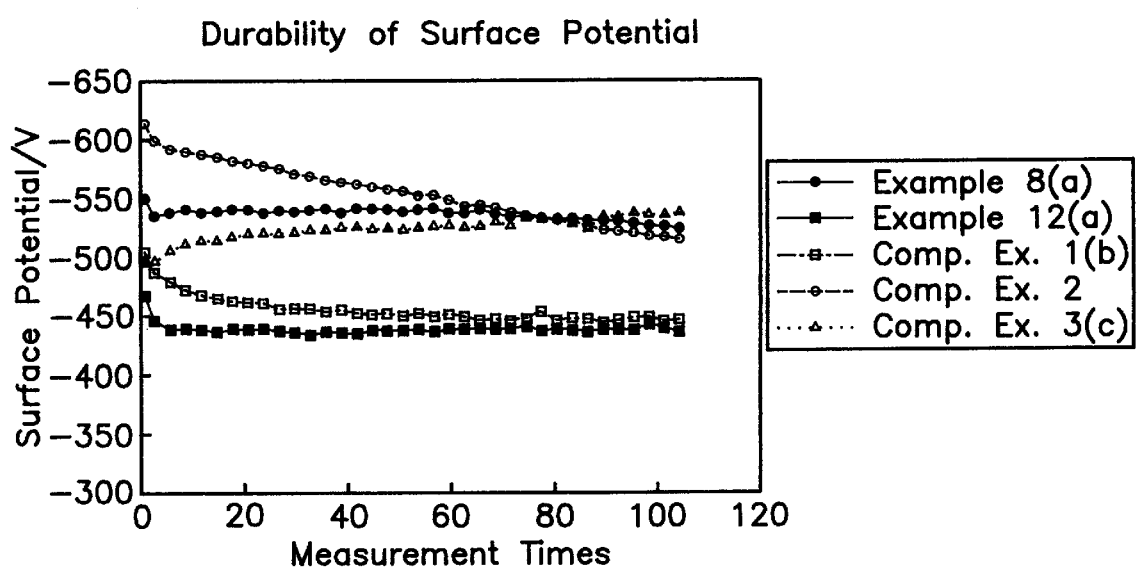
FIG. 10 is a plot of results obtained by potential durability analysis of photoreceptors of the present invention.

Additionally, durability of the electrophotographic photoreceptors prepared in Examples 8 (a), 11 (a), Comparative Examples 1 (b), 2 (a), 3 (c) was tested, by using the static electricity charging tester "EPA-8200" set to the durability testing mode. The electrophotographic photoreceptors were charged repeatedly 100 times, and alternation of the initial charged potential ($V_{max}$), and half-value exposure amount (photoresponse) ($E_{1/2}$) was measured. The results were shown in FIGS. 9 and 10.

As a result, it is confirmed that the μ-oxo-aluminum/gallium Pc dimer, and the mixed crystals comprising the μ-oxo-aluminum/gallium Pc dimer show the electroconductive properties excellent in stability and durability suitable for an OPC having low to middle photoresponse, and they are useful for a charge generating material for an electrophotographic photoreceptor.

The mixed crystal of the present invention, particularly III-form mixed crystal is excellent in durability of photoresponse and durability of electric potential by comparison with the χ-form free metal Pc, and it is particularly useful for a charge generating material for an electrophotographic photoreceptor.

What is claimed is:

1. μ-Oxo-aluminum/gallium phthalocyanine dimer having a structure of the formula (A):

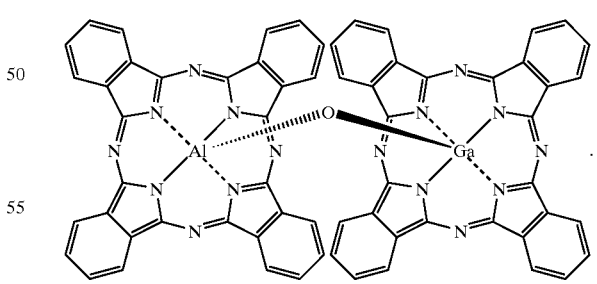

(A)

2. A mixed crystal comprising the μ-oxo-aluminum/gallium phthalocyanine dimer of claim 1 (A).

3. The mixed crystal according to claim 2, further comprising μ-oxo-aluminum phthalocyanine dimer (B), or μ-oxo-gallium phthalocyanine dimer (C); or both μ-oxo-aluminum phthalocyanine dimer (B), and μ-oxo-gallium phthalocyanine dimer (C):

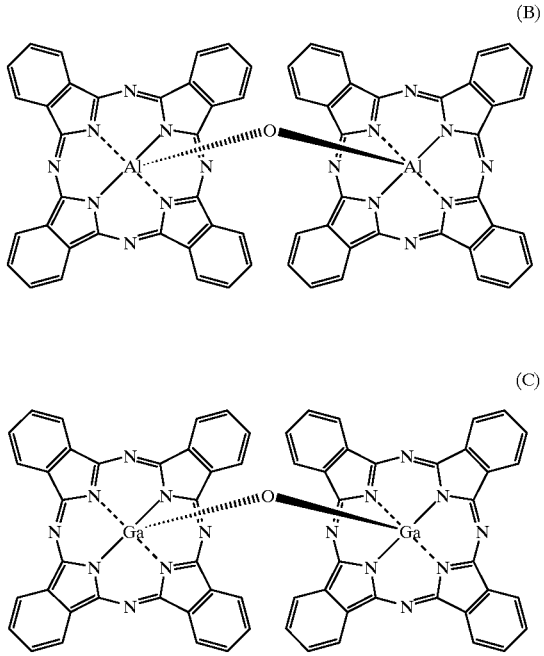

4. The mixed crystal according to claim 2, having a polymorph which shows diffraction peaks at a Bragg angle (2 θ±0.2°) of 6.6°, 15.2°, 22.5°, 23.0° and 24.0° in an X-ray diffraction spectrum by CuK α-ray [I-form].

5. The mixed crystal according to claim 2, having a polymorph which shows diffraction peaks at a Bragg angle (2 θ±0.2) of 6.8°, 9.7°, 15.4° and 23.9° in an X-ray diffraction spectrum by CuK α-ray [II-form].

6. The mixed crystal according to claim 2, having a polymorph which shows diffraction peaks at a Bragg angle (2 θ±0.2°) of 6.7°, 7.3°, 9.8°, 15.3°, 25.0° and 28.2° in an X-ray diffraction spectrum by CuK α-ray [III-form].

7. The mixed crystal according to claim 2, having a polymorph which shows diffraction peaks at a Bragg angle (2 θ±0.2°) of 6.4°, 6.7°, 9.8° and 23.5° in an X-ray diffraction spectrum by CuK α-ray [IV-form].

8. The mixed crystal according to claim 2, having a polymorph which shows diffraction peaks at a Bragg angle (2 θ ±0.2°) of 6.9°, 15.5°, 13.3° and 24.1° in an X-ray diffraction spectrum by CuK α-ray [Amorphous-form].

9. The mixed crystal according to claim 2, wherein content of μ-oxo-aluminum/gallium phthalocyanine dimer (A) is larger than content of μ-oxo-aluminum phthalocyanine dimer (B), and larger than content of μ-oxo-gallium phthalocyanine dimer (C).

10. A charge generating material for use in an electrophotographic photoreceptor consisting of the mixed crystal according to claim 2.

11. A process for preparing a mixed crystal comprising μ-oxo-aluminum/gallium phthalocyanine dimer (A), which comprises the steps of:

obtaining chloroaluminium phthalocyanine and chlorogallium phthalocyanine;

mixing the chloroaluminium phthalocyanine and the chlorogallium phthalocyanine;

conducting acid pasting of the mixture of chloroaluminium phthalocyanine and chlorogallium phthalocyanine by using concentrated sulfuric acid; and heating and dehydrating the mixture in a water-immiscible organic solvent.

12. The process according to claim 11, wherein the mixing ratio of chloroaluminium phthalocyanine and chlorogallium phthalocyanine is 1/1 by mol.

13. A process for preparing the Amorphous-form mixed crystal of claim 8, which comprises the step of: dry milling the mixed crystal obtained by the process according to claim 11.

14. A process for preparing the I-form mixed crystal of claim 4, which comprises the step of: simply dispersing or wet milling the amorphous-form mixed crystal obtained by the process according to claim 13 in chloronaphthalene.

15. A process for preparing the mixed crystal of claim 5 (II-form, III-form, or IV-form) which comprises the step of: simply dispersing or wet milling the amorphous-form mixed crystal obtained by the process according to claim 13 in an organic solvent.

16. An electrophotographic photoreceptor comprising the μ-oxo-aluminum/gallium phthalocyanine dimer (A) of claim 1.

17. An electrophotographic photoreceptor comprising the charge generating material of claim 10.

* * * * *